(12) United States Patent
Habacker

(10) Patent No.: US 7,731,267 B2
(45) Date of Patent: Jun. 8, 2010

(54) CONVERTIBLE VEHICLE

(75) Inventor: Norbert Habacker, Bramsche (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 11/663,876

(22) PCT Filed: Sep. 19, 2005

(86) PCT No.: PCT/DE2005/001648

§ 371 (c)(1),
(2), (4) Date: May 28, 2008

(87) PCT Pub. No.: WO2006/032248

PCT Pub. Date: Mar. 30, 2006

(65) Prior Publication Data

US 2008/0309117 A1 Dec. 18, 2008

(30) Foreign Application Priority Data

Sep. 25, 2004 (DE) ........................ 10 2004 046 602

(51) Int. Cl.
*B60J 7/185* (2006.01)

(52) U.S. Cl. ..................................................... 296/121

(58) Field of Classification Search .................. 296/121
See application file for complete search history.

(56) References Cited

U.S. PATENT DOCUMENTS

| 1,269,311 | A | | 6/1918 | Rixon |
|---|---|---|---|---|
| 4,134,611 | A | | 1/1979 | Craven et al. |
| 5,595,407 | A | | 1/1997 | ter Horst et al. |
| 5,722,275 | A | | 3/1998 | Price et al. |
| 7,021,696 | B2 | * | 4/2006 | Doncov et al. ............... 296/121 |
| 7,226,110 | B2 | * | 6/2007 | Doncov et al. ............... 296/121 |

FOREIGN PATENT DOCUMENTS

| EP | 0657607 A1 | 6/1995 |
|---|---|---|
| EP | 0972665 | 1/2000 |

* cited by examiner

*Primary Examiner*—H Gutman
(74) *Attorney, Agent, or Firm*—Gifford, Krass, Sprinkle, Anderson & Citkowski, P.C.

(57) ABSTRACT

A convertible car includes a mobile roof which can be retained on a windshield frame when closed. For retaining the roof, at least two mobile engaging elements and at least one actuating element for the same are provided. The actuating element is operatively coupled with the engaging elements via respective force transmitters which project with one component in the vehicle transverse direction. At least inward pointing ends of the force transmitters, for the purpose of force transmission, are movable in a purely translational manner and in parallel to their projecting component.

7 Claims, 5 Drawing Sheets

CONVERTIBLE VEHICLE

REFERENCE TO RELATED APPLICATIONS

This application is the United States national phase of Patent Cooperation Treaty application No. PCT/DE05/001648, filed Sep. 19, 2005, which claims priority to German patent application No. DE10 2004 046602.5, filed Sep. 25, 2004, the entire content of both of which are incorporated herein by reference.

FIELD OF THE INVENTION

The invention relates to a convertible vehicle comprising a roof which can be secured to a windshield frame via engagement members as well as to a closing apparatus herefor.

BACKGROUND OF THE INVENTION

A number of convertible vehicles are known in which the movable roof can be secured to the windshield frame of the vehicle in its closed position via two laterally outwardly disposed engagement members, for instance rotary latches, arresting hooks or the like.

Both engagement members are connected to a central manual or powered drive via force communicators, for instance chains or in particular pull and/or push rods, extended substantially transversely to the vehicle and thus following the course of the roof peak contacting the windshield frame.

EP 0 972 665 B1 shows a typical arrangement having a central drive which includes a vertical rotary axle and acts on a drive wheel rotatable around this axis, with two pull-push rods being held mutually opposite at said drive wheel. The ends of said pull-push rods are cropped to enable a securing over dead center position in the closed roof position and nevertheless to ensure that the push-pull rods of the two sides do not collide with one another with a closed roof When the drive wheel rotates, the cropped portions of the rods migrate far to the front or rear respectively so that large space requirements result in the longitudinal direction of the vehicle. Furthermore, in the securing over dead center position, the cropped ends are asymmetrical to one another with respect to the longitudinal direction of the vehicle, whereby it is made difficult to install a closing apparatus of this type for instance in a similar vehicle transposed in the longitudinal direction of the vehicle. The asymmetry can increase on transposition so that a modification of the closing apparatus becomes necessary and an adaptation to different vehicles is made difficult.

Accordingly, it remains desirable to provide a roof closing mechanism that is easily adaptable to a variety of vehicles.

SUMMARY OF THE INVENTION

According to one aspect of the invention, a convertible vehicle includes a movable roof which can be held in its closed position at a windshield frame, with at least two movable engagement members being provided for holding the roof in the closed position and at least one actuation member in operative communication with the engagement members via force communicators outwardly engaging in each case with a component in the transverse direction of the vehicle, wherein at least ends of the force communicators facing a vertical longitudinal central plane of the vehicle can be moved overall for the force transmission in a purely translatory manner and parallel to their outwardly engaging extent component.

By this arrangement, a movement of the ends of the force communicators facing the actuation member over the circumference of a central drive wheel is dispensable. These ends therefore do not have to be transposed in the longitudinal direction of the vehicle and are in particular not asymmetric to one another. It is rather the case that they are moved as a whole only on a translatory path without a rotary portion, with it being ensured by the movement in their direction of extent that no path is covered, or only a minimum path is covered with an obliquely running extent, in the longitudinal direction of the vehicle. The space saving is therefore considerable. In addition, an adaptation to different vehicle types is possible solely by changing the stroke of the movement in the direction of extent of the force communicators. It is therefore simply possible to transpose a closing apparatus in accordance with the invention by some centimeters in the longitudinal direction of the vehicle to adapt it to different vehicles. In this connection, the inner ends of the force communicators can be pivotably connected to regions disposed further outwardly so that every freedom is maintained for the design.

According to another aspect of the invention, a convertible vehicle includes a movable roof which can be held in its closed position at a windshield frame, with at least two movable engagement members being provided for holding the roof in the closed position and at least one actuation member in operative communication with the engagement members via force communicators outwardly engaging in each case with a component in the transverse direction of the vehicle, wherein a rotary member which is rotatable about a transverse axis of the vehicle is rotatably movable by means of the actuation member and effects in this context a simultaneous rotation of at least one end of a force communicator around its longitudinal axis and a movement along this axis.

By this arrangement, a space-saving and reliable force transmission between the actuation member and the force communicators is possible due to the rotation of the force communicators around their own axis. Despite their rotation around their own axis, the force communicators overall can nevertheless be moved as a whole in a purely translatory manner so that the advantage of the transposition capability in the longitudinal direction of the vehicle and the small space requirements are maintained. Such a pushing out or in of the force communicators with a simultaneous rotation around the axis of extent also permits a space-saving arrangement of a drive disposed horizontal and parallel to the extent of the force communicators.

A sleeve in which the force communicators are rotatably supported can in particular be used for the transmission to the force communicators. The extent of the closure in the longitudinal direction of the vehicle is also reduced hereby. The same applies when the ratios are reversed, that is two sleeves acting as inner ends of the force communicators are rotatably supported laterally on a central spindle.

Thread turns running in opposite directions on both sides ensure that in the first of the aforesaid cases a throughgoing sleeve can be used on whose rotation mutually oppositely disposed force communicators move out or in simultaneously.

It is particularly favorable for the closure to be made in modular form overall and to include a base carrier on which selectively an electrical or a hydraulic drive member can be installed. The same base carrier can then be used with unchanged dimensions for different vehicle types, which improves its flexible application.

Advantages of the present invention will be readily appreciated, as the same becomes better understood by reference to the following detailed description when considered in connection with the accompanying drawings, wherein:

DETAILED DESCRIPTION OF THE INVENTION

Figure 1:
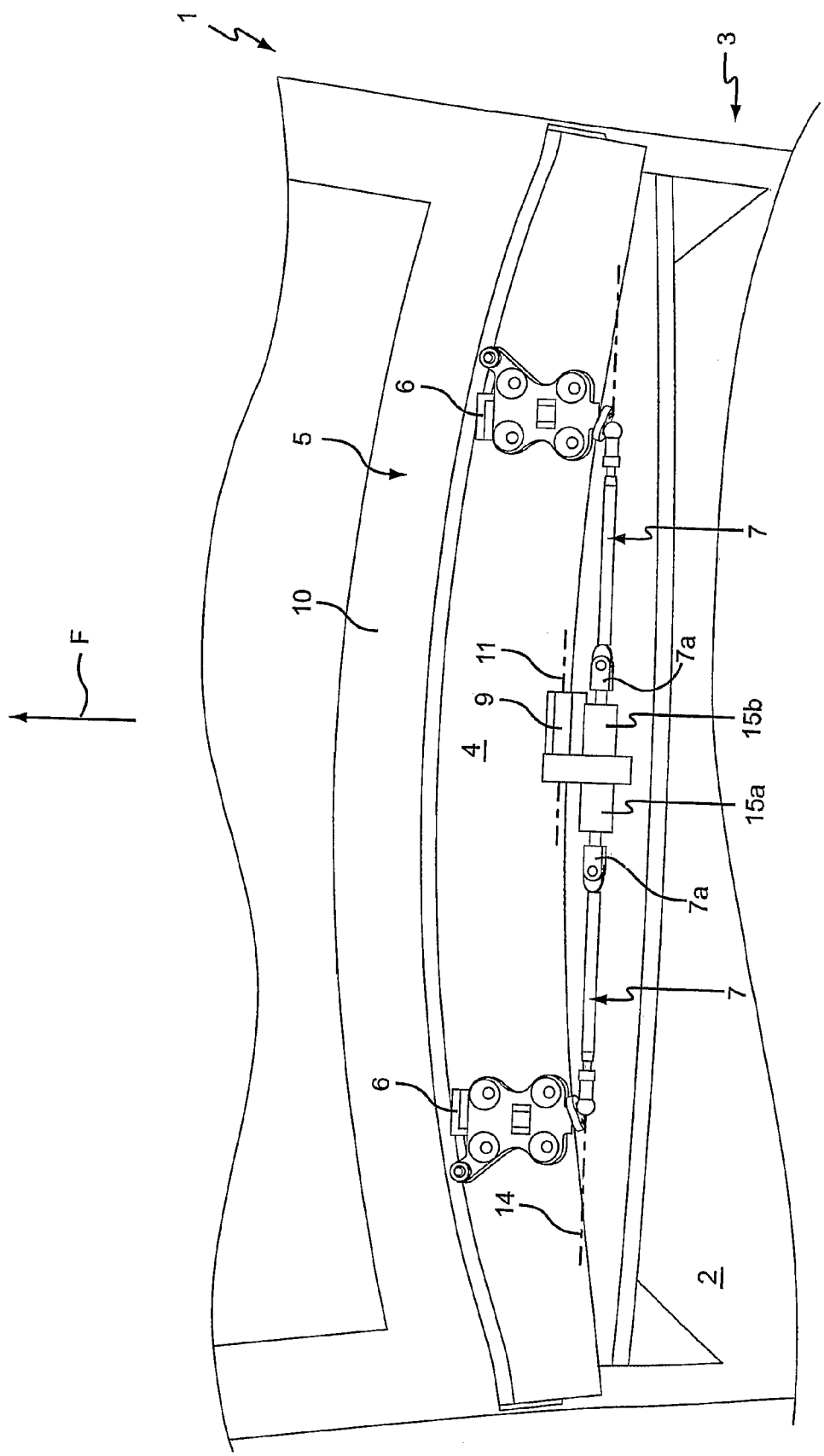
FIG. 1 shows a view from below into the vehicle in accordance with the invention having the front roof end (roof peak) with an indicated roof cover and with a windshield frame only indicated schematically and transparently with a central actuation member and laterally outwardly disposed engagement members for latching (not shown here) to the windshield frame which are in operative communication with the actuation member via pull-push bars.
Figure 2:
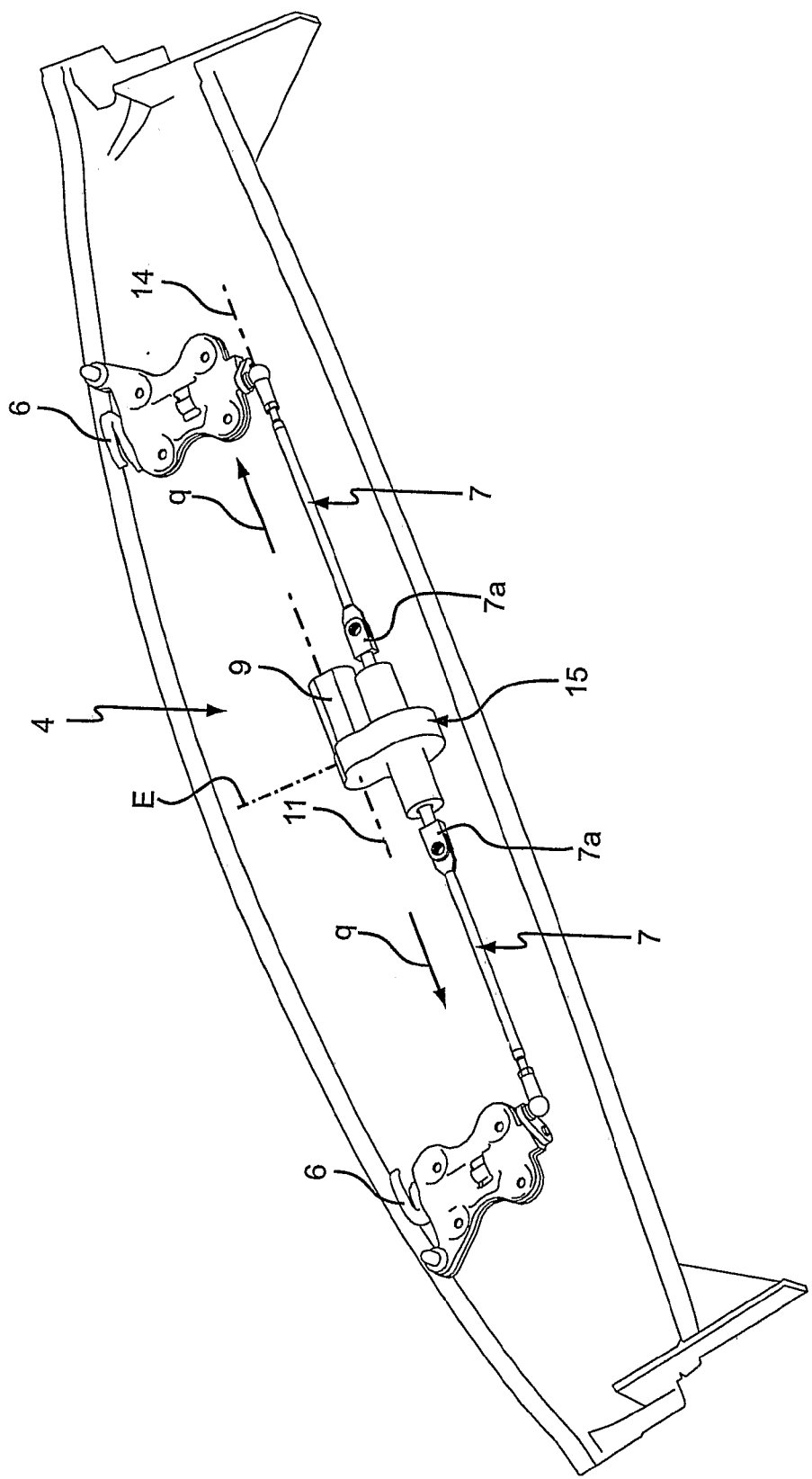
FIG. 2 shows a perspective view of the roof peak obliquely from below in accordance with FIG. 1, but without a windshield frame or a roof cover.
Figure 3:
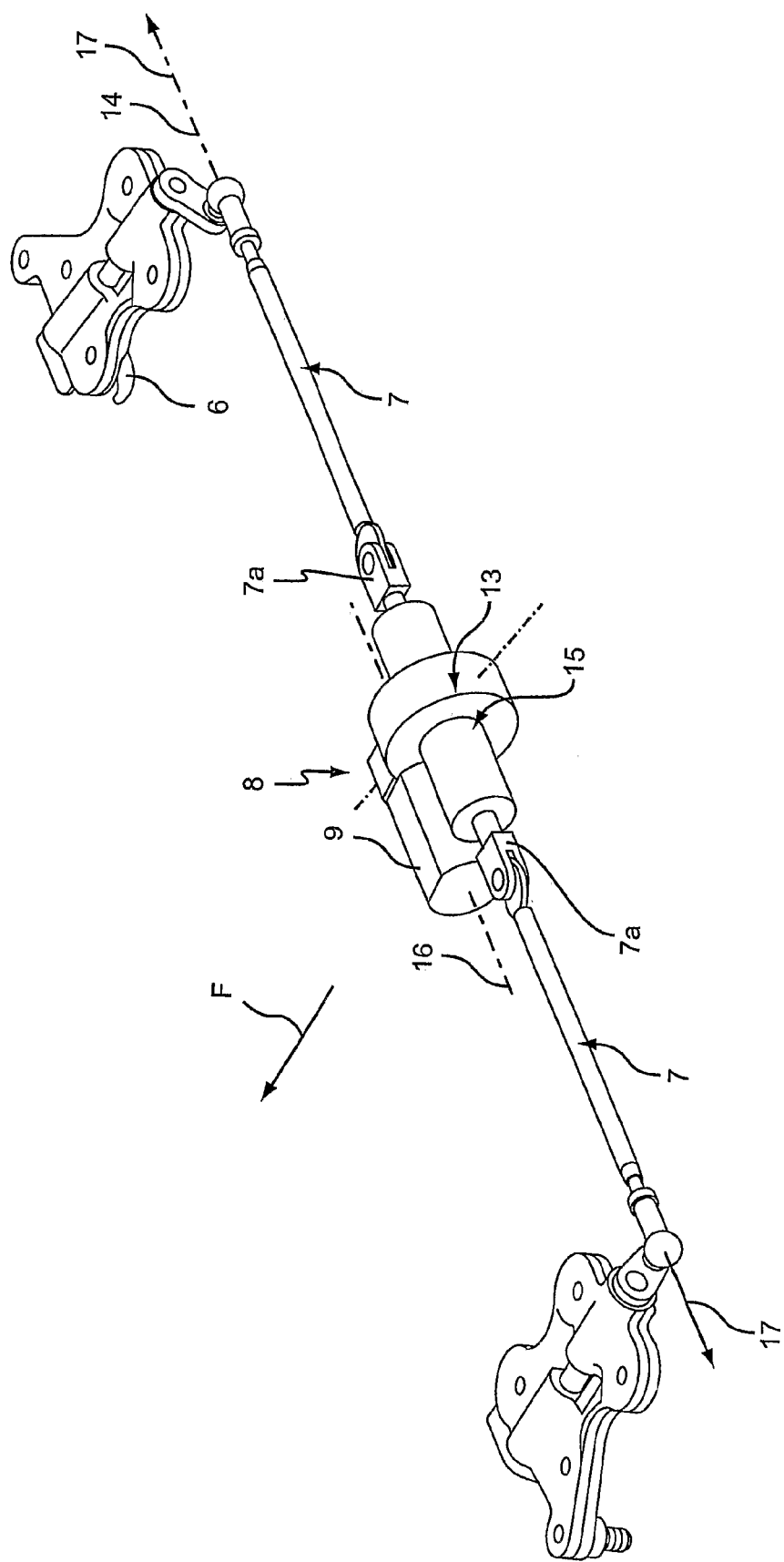
FIG. 3 shows a perspective view of the closure module obliquely from above.

Referring to the figures, a convertible vehicle according to the invention is indicated at 1. The vehicle 1 includes a movable roof 3, which can be actuated between a closed or extended position extending over a passenger compartment and an open or retracted position disposed in a stowage space disposed adjacent to the passenger compartment. In the illustrated embodiment, the movable roof 3 includes a flexible roof cover 2.

The roof 3 includes an end or roof peak 4 located toward a front of the roof 3 in a direction of travel, indicated at F. Described in greater detail below, the roof peak 4 is latchable to a windshield frame 5 of the vehicle 1 to secure the roof 3 in the closed position.

In the illustrated embodiments, the vehicle 1 includes a pair of engagement members 6 for releasably latching the roof peak 4 to the windshield frame 5. The engagement members are disposed outwardly and laterally in a generally transverse direction q in the vehicle. The engagement members 6 are generally hook shaped and are pivotable around horizontal axes. The number of engagement members is also variable. A central engagement member may, for example, be provided.

The engagement bodies 6 are movable via force communicators 7 starting from a central actuation member 8 here and in each case outwardly engaging with an at least substantial extent in the transverse direction q of the vehicle. The force communicators are configured in the illustrated embodiments as pull-push rods. The actuation member 8, which can also lie off-center with respect to the transverse extent of the vehicle, can be formed by a manual handle pivotable, for instance, around a horizontal axis or can be formed by a hydraulic 9 or electrical drive member.

Figure 4:
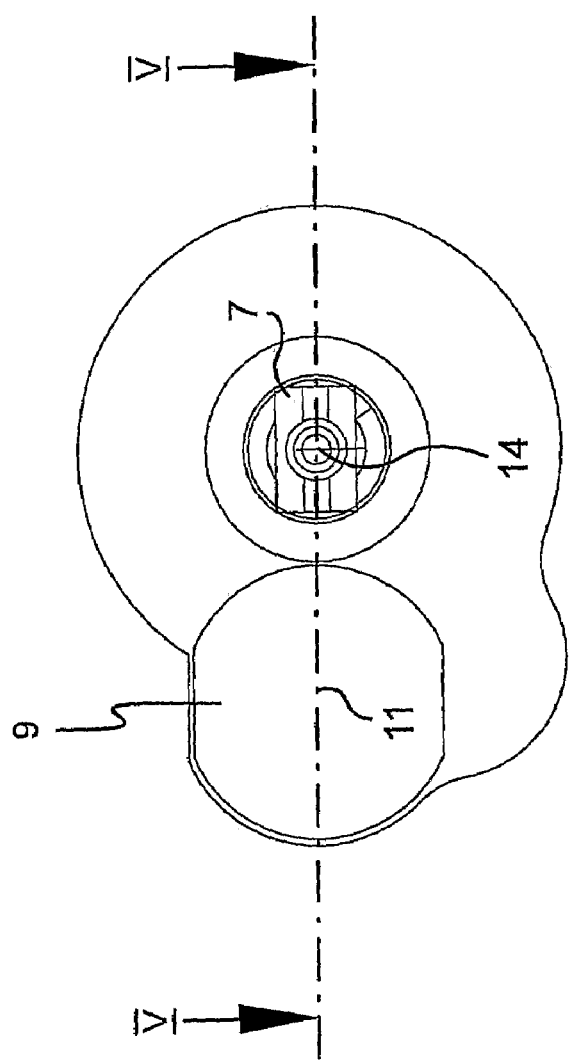
FIG. 4 shows an individual part view of the drive member, viewed in the transverse direction of the vehicle, with a rotation member and a force communicator held thereon.

The latter is disposed generally parallel to a transverse direction q of the vehicle and in the plane of the force communicators 7, thus substantially horizontally and in a space saving manner, as can be recognized in FIG. 4, for example, inside the roof peak 4. Since only a relatively small exertion of power is required, the drive member 9f can be made so flat that the vertical extent of the roof peak 4 does not have to be enlarged for its reception.

Due to the small packaging size of the actuation member 8, it can also be possible to arrange it with the engagement members 6 and the force communicators 7 in the upper transverse frame part 10 of the windshield frame 5.

At least the ends 7a of the force communicators 7 facing the vertical longitudinal central plane E can be transposed purely translatorily overall for the actuation of the engagement members 6 without these inwardly facing ends 7a of the force communicators 7 being held on a drive wheel and thus being movable transversely to the translation direction. The actuation therefore does not need any movement space in the longitudinal direction of the vehicle; the depth of the roof peak 4 can be minimized.

In accordance with the illustrated embodiment, an electric motor 9 with a rotor rotating around an axis 11 is shown as the drive member, with the rotor including a gear 12 via which it is in contact with a rotary member 13 which can be rotated around an axis 14 extended in the transverse direction q of the vehicle here. The axes 11 and 14 can therefore lie generally parallel to one another. The rotary member 13 in the illustrated embodiment includes a sleeve 15 with limbs 15a, 15b which are disposed diametrically opposite one another and in which the inwardly facing ends 7a of the force communicators 7 are movably received. The limbs 15a, 15b each have an internal thread with mutually opposite pitches for this purpose.

The force communicators 7 are accordingly provided in the region of their ends 7a with a complementary external thread with steps 16 engaging into the internal thread. A reversal of the ratios is alternatively possible with a spindle-like rotary body and sleeves movably held thereon as ends of the force communicators 7.

As illustrated, joints can lie within the force communicators 7 so that the force communicators 7 can also extend slightly angled with respect to the transverse direction of the vehicle in the further extent to the transverse sides q. Provided that no joints of this type are provided, the total force communicators will be moved in the same way as the inner ends 7a purely translatorily outwardly or inwardly—with rotation around their own axis 14.

In accordance with the drawing, by rotation of the total sleeve body 15 in one sense of rotation, both inner ends 7a of the force communicators 7 are therefore simultaneously pushed out or pulled in purely translatorily parallel to the axis 14. The sleeve member 15 can be made in one piece.

Instead of a rotary member 13, a different means can also be provided to effect the transverse movement of the force communicators 7. For instance, two hydraulic cylinders which push in and out in opposite directions and which are each disposed horizontally and transversely to the direction of travel can thus be provided and can each influence a force communicator 7. An individual cylinder can also influence both force communicators 7 simultaneously and synchronously via a deflection device.

Figure 5:
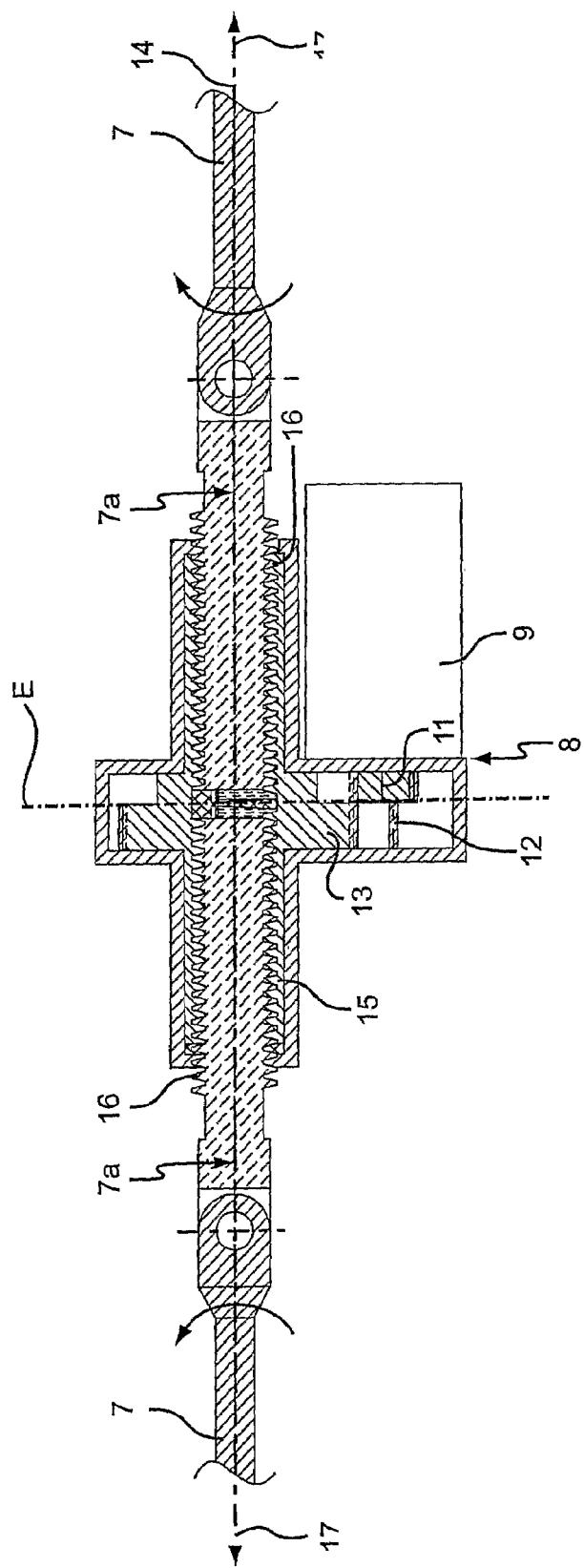
FIG. 5 shows a section along the line V-V in FIG. 4.

In FIG. 5, the closed roof position is drawn in which the ends 7a of the force communicators 7 reach their position closest to the longitudinal centre of the vehicle and can be pushed out from there by rotation of the sleeve 15 in the direction of the arrows 17, with them then simultaneously opening the engagement members 6 via corresponding force deflections and releasing the roof peak 4 from the windshield frame 5.

A base carrier of the closing apparatus 8 is configured here such that selectively the one or the other type of drive can be installed so that the module 8 can be used without further modifications both in vehicles with an electrical closure actuation and a hydraulic closure actuation, which substantially expands the application possibilities and permits a mass production of the module 8. An installation possibility for a manual actuation lever can also be provided so that the module 8 can also be utilized for a cost-effective manual actuation.

The closure module 8 can be pre-assembled and tested in every case before its installation and can be mounted on the roof peak 4 as a finished set modular unit.

The vehicle as shown in the illustrated embodiment and described herein is a soft top. It should, however, be readily appreciated by those having ordinary skill in the art that the top may also be a hard top having rigid panels instead of a flexible cover, or a hybrid top having a combination of rigid panels and a flexible cover. Further, the vehicle as described herein may be a two seater or have a larger interior space with multiple rows of seating.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A movable roof for use with a convertible vehicle, the roof being movable between a stored position wherein the roof is stored within a storage compartment of the vehicle, and a closed position wherein the roof extends between the storage compartment and a windshield frame of the convertible vehicle, the roof having a front end engaging the windshield frame when the roof is in the closed position, a transverse axis being defined side to side at the front end of the roof, the roof comprising:

a first and a second engagement member disposed at the front end of the roof, each engagement member movable between a free position and a secured position, wherein in the secured position the engagement member engages the windshield frame so as to secure the roof to the windshield frame;

an actuation assembly disposed at the front end of the roof at a position between the first and second engagement members, the actuation assembly including a drive unit having a longitudinal axis disposed generally parallel to the transverse axis and a rotary member that is rotatable about the transverse axis; and a first and a second elongated force communicator each having an inner end and an outer end, and a joint disposed between the inner end and the outer end, each elongated force communicators extending generally transversely between its inner and outer ends, the inner ends each being threadingly engaged with the rotary member such that rotation of the rotary member causes movement of the inner end of the force communicators purely along the transverse axis and transverse movement of the elongated force communicators, the outer end of each elongated force communicator being interconnected with one of the engagement members such that linear movement of the inner end of each force communicator along the transverse axis causes the engagement members to move between the secured and free positions.

2. A convertible vehicle in accordance with claim 1, wherein the rotary member is configured as a sleeve having an interior with at least one turn of a thread in the interior or as a spindle having an outer side with at least one turn of a thread on the outer side.

3. A convertible vehicle in accordance with claim 2, wherein the at least one thread of the rotary member comprises turns of threads increasing in opposite directions toward both transverse sides of the vehicle.

4. A convertible vehicle in accordance with claim 3, wherein the force communicators are each provided with outwardly projecting steps which engage into the turns of the thread.

5. A convertible vehicle in accordance with claim 4, wherein the force communicators are made as pull-push bars.

6. The movable roof of claim 1, wherein:

each engagement member includes a pivotal arm; and the outer end of each elongated force communicator is pivotally interconnected with the pivotal aim of one of the engagement members.

7. The movable roof of claim 1, wherein the longitudinal axis of the drive unit is offset from the transverse axis.

* * * * *

UNITED STATES PATENT AND TRADEMARK OFFICE
CERTIFICATE OF CORRECTION

PATENT NO. : 7,731,267 B2  Page 1 of 1
APPLICATION NO. : 11/663876
DATED : June 8, 2010
INVENTOR(S) : Norbert Habacker It is certified that error appears in the above-identified patent and that said Letters Patent is hereby corrected as shown below:

Column 3, line 63: Replace "9f" with --9--.

Column 6, line 37: Replace "aim" with --arm--.

Signed and Sealed this

Third Day of August, 2010

David J. Kappos
*Director of the United States Patent and Trademark Office*